A. BETTS.
Devices for Changing the Speed of Machinery.

No. 144,499.                                   Patented Nov. 11, 1873.

Witnesses:
G. Mathys
Solon C. Kemon

Inventor,
Alfred Betts
Per
Attorneys.

UNITED STATES PATENT OFFICE.

ALFRED BETTS, OF WILMINGTON, DELAWARE, ASSIGNOR TO E. & A. BETTS, OF SAME PLACE.

IMPROVEMENT IN DEVICES FOR CHANGING THE SPEED OF MACHINERY.

Specification forming part of Letters Patent No. 144,499, dated November 11, 1873; application filed October 23, 1873.

*To all whom it may concern:*

Be it known that I, ALFRED BETTS, of Wilmington, in the county of New Castle and State of Delaware, have invented a new and Improved Device for Changing the Speed of Machinery; and I do hereby declare that the following is a full, clear, and exact description of the same, reference being had to the accompanying drawing forming a part of this specification, in which—

Figure 1:
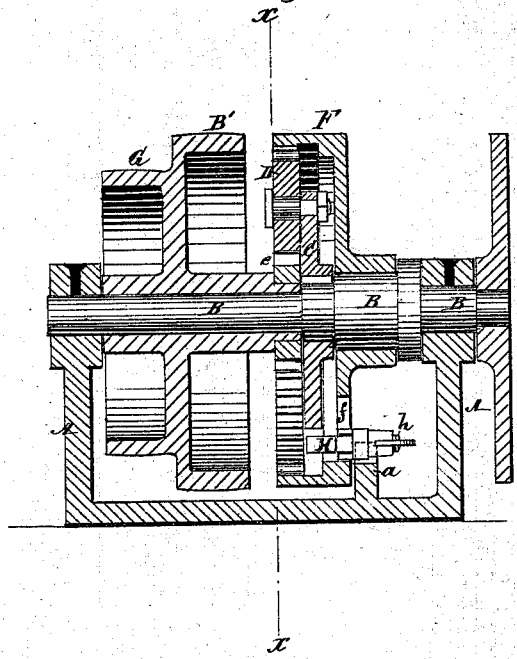
Figure 2:
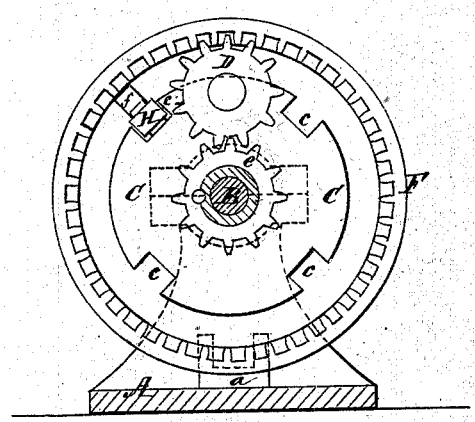

Figure 1 is a longitudinal vertical section. Fig. 2 is a cross-section in line $x\ x$ of Fig. 1.

The invention will first be described, in connection with all that is necessary to a full understanding thereof, and then pointed out in the claim.

A represents the head-stock of a lathe-boring mill-drill, or other machine in whose upright bearings is journaled a spindle, B. To this spindle is keyed a notched disk, C $c$, upon a stud projecting from which is journaled an idler-pinion, D. G is the usual pulley or wheel, loosely fitted upon the spindle B, and having attached to the inner end of its hub a pinion, $e$, which meshes into the idler-pinion D. H is a stop, having a screw-shank, $h$, that protrudes through and is adjustable in a slot, $f$, of the internal gear-wheel, said stop being provided with a thumb-nut to fasten it at its points of adjustment.

By moving the stop H into a notch, $c$, of the disk C, the said disk and spindle and internal gear-wheel F are locked securely together and must turn synchronously, a maximum of speed being generated with a given pulley and power. On the other hand, if the stop is removed from the notched disk and into the notch of projection $a$, the spindle B and pulley G are connected by intermediate mechanism which multiplies the power at the expense of the speed.

Having thus described my invention, what I claim as new, and desire to secure by Letters Patent, is—

The spindle B, having keyed fast thereto the notched disk C $c$, and loosely-fitted pulley G, and internal gear-wheel F, in combination with the pinions $e$ D, stop H, and notched projection $a'$, as and for the purpose specified.

ALFRED BETTS.

Witnesses:
 E. L. OUVILLE,
 WILLIAM BETTS.